US008128326B2

(12) United States Patent
Hudson

(10) Patent No.: US 8,128,326 B2
(45) Date of Patent: Mar. 6, 2012

(54) APPARATUS AND METHODS FOR REMOVABLY SECURING PAYLOADS IN AN AIRCRAFT

(75) Inventor: Timothy C. Hudson, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 1229 days.

(21) Appl. No.: 11/278,293

(22) Filed: Mar. 31, 2006

(65) Prior Publication Data
US 2007/0253762 A1 Nov. 1, 2007

(51) Int. Cl.
*B60P 7/08* (2006.01)
(52) U.S. Cl. ........................................ 410/105; 410/104
(58) Field of Classification Search .................. 410/104, 410/105, 106, 116; 244/118.1, 118.6, 137.1; 296/65.03; 248/503, 503.1
See application file for complete search history.

(56) References Cited

U.S. PATENT DOCUMENTS

| 3,282,229 | A | * | 11/1966 | Elsner | 410/105 |
| 4,396,175 | A | | 8/1983 | Long et al. | |
| 4,493,470 | A | | 1/1985 | Engel | |
| 5,337,979 | A | | 8/1994 | Bales et al. | |
| 6,626,623 | B2 | * | 9/2003 | DeLay | 410/116 |

FOREIGN PATENT DOCUMENTS
DE 2556000 C2 6/1977
* cited by examiner

*Primary Examiner* — Stephen Gordon

(57) ABSTRACT

Apparatus and methods for removably securing payloads are disclosed. In one embodiment, a method includes coupling the payload to a body of a locking assembly, engaging an insertion portion of the body into a channel of a track, translating the insertion portion to a second position until at least one self-alignment feature of the locking assembly abuts an abutment portion of the track, the body being substantially constrained from movement away from the track in the second position, and actuating at least one engagement member to a secured position, the body being substantially constrained from movement along the track in the secured position. In an alternate embodiment, in the unsecured position the at least one engagement member is withdrawn from the channel, and in the secured position the at least one engagement member projects into the channel.

11 Claims, 14 Drawing Sheets

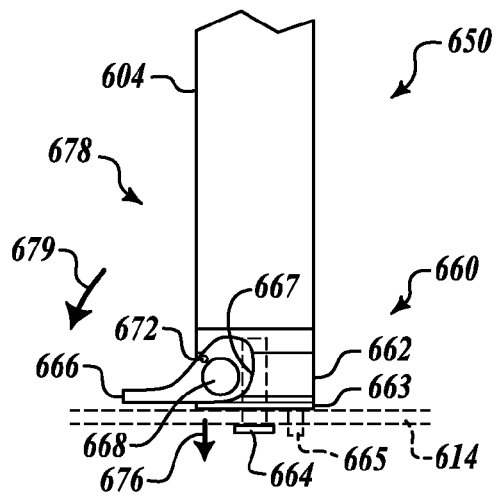 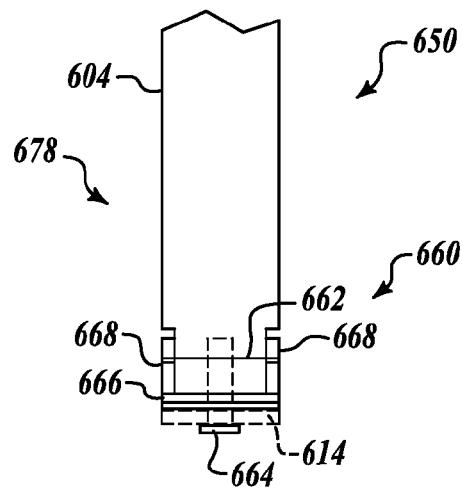
*FIG.20*  *FIG.21*
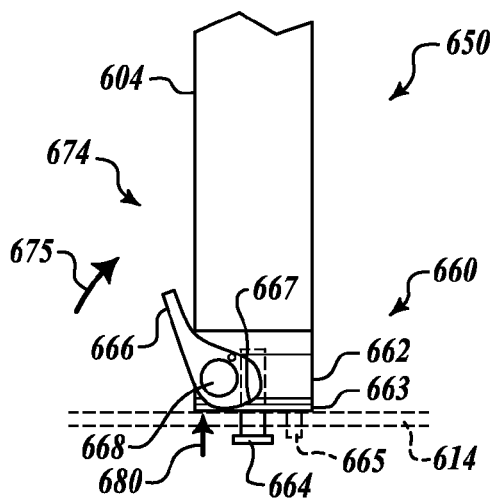
*FIG.22* ered to include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

APPARATUS AND METHODS FOR REMOVABLY SECURING PAYLOADS IN AN AIRCRAFT

CROSS REFERENCE TO RELATED APPLICATIONS

This patent application is related to co-pending, commonly-owned U.S. patent application Ser. No. 11/278,298 entitled "Apparatus and Methods for Removably Securing Payloads in an Aircraft" filed 31 Mar. 2006, which application is incorporated herein by reference.

FIELD OF THE INVENTION

This invention relates generally to securing aircraft payloads, and more particularly, to devices and methods for removably coupling a payload to a load supporting surface in an aircraft.

BACKGROUND OF THE INVENTION

Personnel and cargo are frequently transported in aircraft of various types. For example, some aircraft are configured to carry passengers, while others are configured to carry cargo. Still other aircraft (e.g., a "combi" aircraft) are configured to carry some combination of passengers and cargo in the same aircraft cabin. In all of these aircraft, the payload article is generally secured to a load supporting surface, such as a reinforced floor structure, by removable fittings coupled to the payload article that engage longitudinal tracks mounted on or within the load supporting surface. Accordingly, the payload article, which may include an aircraft seat, a cargo pallet, or other payload containers or devices, may be suitably positioned on a desired portion of the load supporting surface and then secured in the selected position by fixably engaging the fittings in the longitudinal tracks.

The installation and removal of the payload article generally requires the use of one or more hand tools to respectively tension and release the fittings coupling the fitting to the track. As a consequence, in cases where a large number of fittings must be installed or removed, a relatively large amount of time must be devoted to individually tension or release the fittings. For example, when the payload article is a passenger seat in a commercial aircraft, the seat must be properly positioned and located in the tracks so that a desired seat pitch is obtained. The seat is then fixedly coupled to the track using hand tools, such as socket wrenches. Consequently, approximately twenty minutes is required to properly install or remove the seat. Thus, several man-hours are typically required to install or remove only a portion of the seats presently available in a typical commercial passenger aircraft.

There presently exists a need in the art for a fitting that may be removably coupled to a track in a load supporting structure so that a payload article may be quickly and conveniently engaged and disengaged from the track.

SUMMARY OF THE INVENTION

The present invention is directed to apparatus and methods for removably securing payloads in an aircraft. Embodiments of the invention may advantageously reduce the time and expense associated with installation and removal of payloads from within an aircraft, and may improve the performance and maintainability of such payload securing apparatus, in comparison with the prior art.

In one embodiment, a method for securing a payload to a track having a channel includes coupling the payload to a body of a locking assembly, engaging an insertion portion of the body into the channel, translating the insertion portion of the body along the track from a first position to a second position until at least one self-alignment feature of the locking assembly abuts an abutment portion of the track, the body of the locking assembly being substantially constrained from movement away from the track in the second position, and actuating at least one engagement member from an unsecured position to a secured position, the body being substantially constrained from movement along the track by the at least one engagement member when the at least one engagement member is positioned in the secured position.

In a further embodiment, actuating at least one engagement member from an unsecured position to a secured position includes actuating an actuation member moveably coupled to the body from an unsecured position to a secured position, the at least one engagement member being coupled to the actuation member such that in the unsecured position the at least one engagement member is withdrawn from the channel, and in the secured position the at least one engagement member projects into the channel.

BRIEF DESCRIPTION OF THE DRAWINGS

Embodiments of the present invention are described in detail below with reference to the following drawings.

FIGS. 20 and 21 are side and front elevational views of a locking assembly for securing a payload article in accordance with yet another embodiment of the invention;

FIG. 22 is a side elevational view of the locking assembly of FIG. 20 in a unsecured position;

DETAILED DESCRIPTION

The present invention relates to securing aircraft payloads, and more particularly, to devices and methods for removably coupling a payload to an aircraft floor. Many specific details of certain embodiments of the invention are set forth in the following description and in FIGS. 1 through 30 to provide a thorough understanding of such embodiments. One skilled in the art, however, will understand that the present invention may have additional embodiments, or that the present invention may be practiced without several of the details described in the following description.

Figure 1:
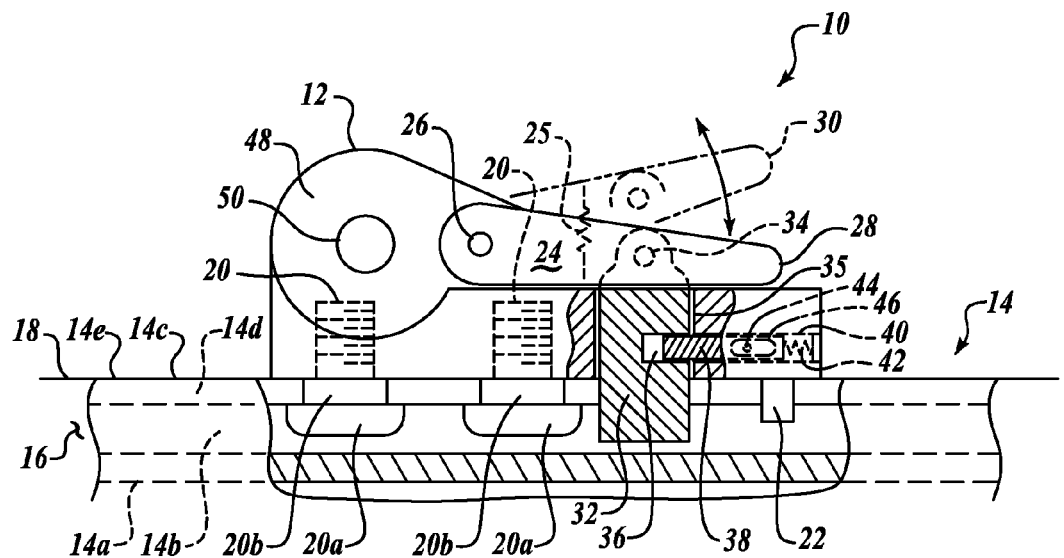
FIG. 1 is a partial cutaway side elevational view of a locking apparatus for securing a payload article according to an embodiment of the invention.

FIG. 1 is a partial cutaway side elevational view of a locking apparatus 10 for securing a payload article according to an embodiment of the invention. The locking apparatus 10 includes a body 12 that is positioned on a track 14 that is generally recessed in a load supporting structure 16 so that the track 14 is approximately even with an elevation corresponding to a load surface 18. The track 14 is of conventional design and comprises a generally channel shaped member that is fixedly coupled to the structure 16. The track 14 includes a bottom wall portion 14a that extends between spaced-apart side walls 14b having inwardly extending flange portions 14c that are spaced apart to form a longitudinal groove 14d that extends along a length of the track 14.

Figure 2:
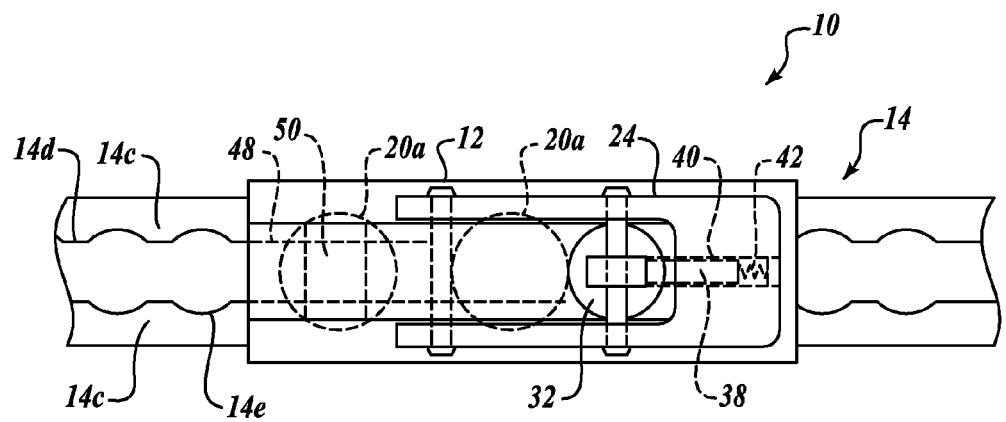
FIG. 2 is a plan view of the locking apparatus of FIG. 1.

With reference also now to FIG. 2, which is a plan view of the apparatus 10 of FIG. 1, the track 14 further includes a plurality of spaced apart clearance openings 14e that extend outwardly from the groove 14d. The clearance openings 14e are regularly spaced along at least a portion of the length of the track 14. The body 12 is configured to receive one or more bolts 20 that extend into the body 12 and engage the inwardly extending flange portions 14c of the track 14. A head 20a of the bolt 20 is suitably dimensioned to extend into and through the clearance openings 14e formed in the track 14, while a shank 20b of the bolt 20 is dimensioned to extend into the groove 14d. Accordingly, when the apparatus 10 is positioned on the track 14 as shown in FIG. 1, the heads 20a engage an interior side of the inwardly extending flange portions 14c, while the shank 20b extends through the groove 14d. The bolts 20 are spaced apart so that a distance between the centers of the bolts 20 coincides with the spaced apart clearance openings 14e formed in the track 14.

The body 12 also includes a self-aligning tab 22 fixedly positioned on a lower surface of the body 12 that extends at least partially into the groove 14d to permit the body 12 to be properly located on the track 14, and to properly center the body 12 within the groove 14 when the apparatus 10 is translated longitudinally along the track 14 prior to locking. The self-aligning tab 22 is approximately elliptical in cross section, and dimensioned so that a major axis of the self-aligning tab 22 is greater than a width of the groove 14d.

Still referring to FIG. 1, the apparatus 10 further comprises a lever 24 that is pivotally coupled to the body 12 by a pin 26 that extends laterally through the body 12, and defines a rotational axis for the lever 24. Accordingly, the lever 24 may be rotated from a first position 28 corresponding to a locked position, to a second position 30 that corresponds to an unlocked position. The lever 24 may be coupled to a spring 25 having a bias that moves the lever 24 to the second position 30 when the apparatus 10 is in the unlocked position. A plunger 32 is pivotally coupled to the lever 24 by a pin 34 that extends through the plunger 32 and the lever 24. The plunger 32 further extends downwardly through a bore 35 formed in the body 12, and slides freely in the bore 35 unless the plunger 32 is positioned in the locked position.

As shown in FIG. 1, the plunger 32 further includes a locking recess 36 that extends transversely into the plunger 32 that is configured to receive a locking pin 38 that is positioned within a locking pin bore 40 that extends longitudinally into the body 12 and into the bore 35. The locking pin 38 slides freely within the locking pin bore 40, and is biased inwardly towards the plunger 32 by a spring 42 that is retained within the locking pin bore 40. The locking pin 38 also includes a release hole 44 that extends through the locking pin 38 that is approximately aligned with a release aperture 46 that extends into the body 12 which may be used to release the locking pin 38 from the locked position, as will be described in further detail below.

The body 12 further includes an anchor portion 48 having a hole 50 that projects through the body 12 to provide a coupling attachment point for a payload. Accordingly, the anchor portion 48 may be used to secure a leg of a passenger seat in a commercial aircraft by extending an attachment bolt through the leg and through the hole 50 to fixedly couple the leg to the body 12. Alternately, the anchor portion 48 may be used to receive a corresponding anchor portion of a cargo container or cargo pallet.

Figure 3:
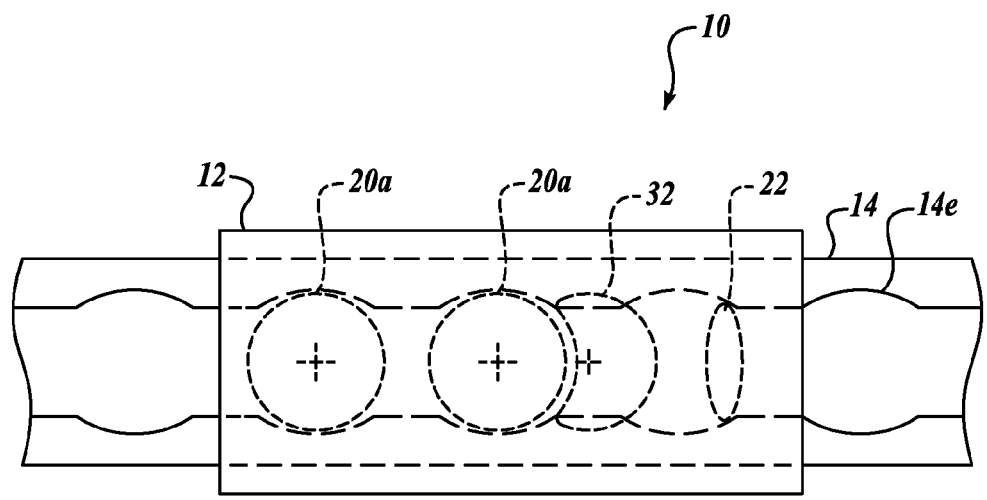
FIG. 3 is a plan view of the locking apparatus of FIG. 1 positioned on a track when the apparatus is in the unlocked condition.
Figure 4:
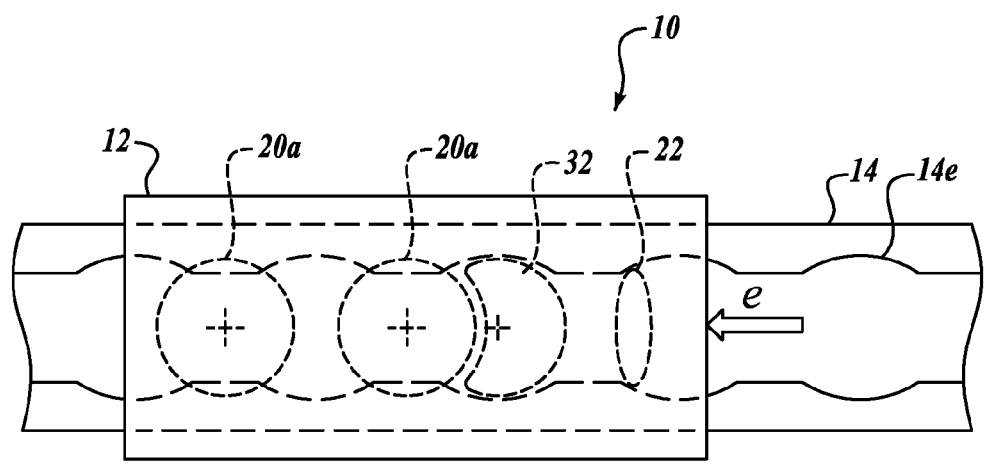
FIG. 4 is a plan view of the apparatus of FIG. 1 with the apparatus in the locked condition.

Referring generally now to FIG. 3 and FIG. 4, the operation of the apparatus 10 will now be described in detail. FIG. 3 is a plan view of the apparatus 10 of FIG. 1 positioned on the track 14 when the apparatus 10 is in the unlocked condition. The apparatus 10 is positioned with the heads 20a of the bolts 20 in alignment with an adjacent pair of the clearance openings 14e so that the heads 20a may be extended through the openings 14e. The self-aligning tab 22 is suitably located on the body 12 so that the tab 22 also extends through a selected one of the clearance openings 14e in the track 14. When the apparatus 10 is in the unlocked condition, the plunger 32 is in a generally retracted position and positioned away from the inwardly extending flange portions 14c so that it does not engage the track 14.

FIG. 4 is a plan view of the apparatus 10 of FIG. 1 with the apparatus 10 in the locked condition. The apparatus 10 is translated a predetermined distance e along the track 14 until the self-aligning tab 22 abuts and interferingly engages the edges of the clearance openings 14e, as shown in FIG. 4. Translation of the apparatus 10 along the track 14 also allows the heads 20a to engage the interior surfaces of the flange portions 14c so that the apparatus 10 is now retained by the track 14. When the self-aligning tab 22 abuts the edges of the clearance opening 14e, the plunger 32 is in alignment with a selected clearance opening 14e that is positioned between the bolts 20 and the self-aligning tab 22. The plunger 32 may then be inserted into the clearance opening 14e by moving the lever 24 from the second position 30 to the first position 28 (FIG. 1). As the lever 24 is moved to the first position 28, the locking recess 36 of the plunger 32 moves into alignment with the locking pin bore 40, so that the locking pin 38 is urged into the locking recess 32 by the spring 42. The apparatus 10 is thus locked to the track 14 when the plunger 32 is positioned and latched in the selected clearance opening 14e.

When it is desired to release the apparatus 10 from the track 14, a suitable tool (not shown) may be inserted into the release aperture 46 (FIG. 1) and engaged into the release hole 44 in the locking pin 38. The locking pin 38 is then urged in an outwardly direction out of the locking recess 36 in the plunger 32. The plunger 32 may then move upwardly by a biasing force exerted by the coupling device within the bore 35 and away from the clearance opening 14e. The apparatus 10 may now be translated longitudinally along the track 14 so that the heads 20a again align with an adjacent pair of the clearance openings 14e. The tool used to release the apparatus 10 may be a simple hand tool with an elongated working portion, such as an awl, a screwdriver, or other similar and commonly available hand tools. Alternately, and in another particular embodiment, at least one of the release aperture 46 in the body 12 and the release hole 44 in the locking pin 38 may be configured to accept a specialized tool to retract the locking pin 38 from the locking recess 36 in the plunger 32. The use of a specialized tool is viewed as particularly advantageous since it may prevent an unauthorized release and/or tampering with the apparatus 10 when it is fixedly coupled to the track 14.

Figure 5:
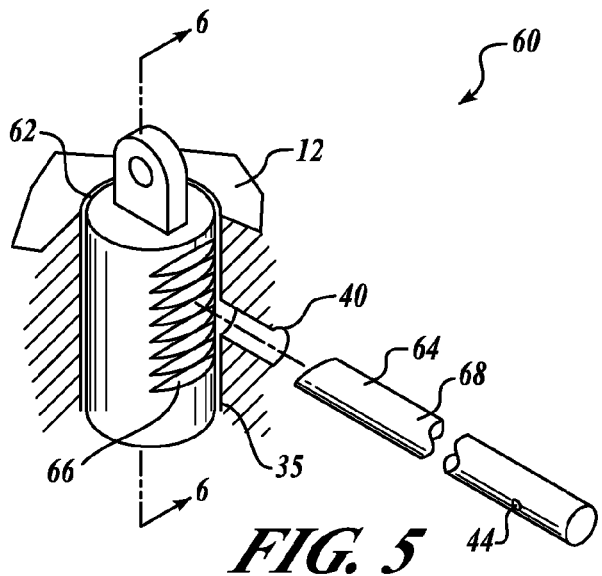
FIG. 5 is an exploded, partial cutaway isometric view of a plunger and a locking pin of a locking apparatus according to another embodiment of the invention.

FIG. 5 is an exploded, partial cutaway isometric view of a plunger 62 and a locking pin 64 of a locking apparatus 60 according to another embodiment of the invention. Many of the details of the apparatus 60 have been presented in connection with the embodiment shown in FIGS. 1 and 2. Accordingly, in the interest of brevity, the foregoing details will not be repeated. In this embodiment, a plunger 62 includes a plurality of teeth 66 configured to engage a pawl 68 formed on an end of the locking pin 64. The teeth 66 and the pawl 68 are configured to permit the plunger 62 to be ratcheted downwardly in the bore 35 as the lever 24 is moved from the second position 30 to the first position 28 (see FIGS. 1 and 2) to properly position the plunger 62 in the selected clearance opening 14e.

Figure 6:
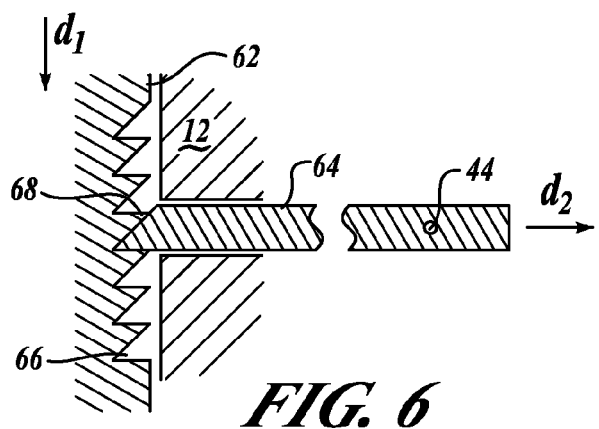
FIG. 6 is a partial cross sectional view of the plunger viewed along the sectional axis 6-6 of FIG. 5.

FIG. 6 is a partial cross sectional view of the plunger 62 viewed along the sectional axis 6-6 of FIG. 5, which shows the teeth 66 of the plunger 62 and the pawl 68 fully engaged. As the plunger 62 is urged downwardly in a direction $d_1$, the teeth 66 and the pawl 68 cooperatively move the locking pin 64 backwardly in a direction $d_2$ and biases the spring 42 (FIG. 1 and FIG. 2). When the pawl 68 is fully disengaged from a selected one of the teeth 66, the pawl 68 thus engages a successive one of the teeth 68 on the plunger 62. When it is desired to release the apparatus 60, the locking pin 64 may be moved backwardly in the direction $d_2$ by engaging a tool with the release hole 44 in the locking pin 44 and urging the pawl 68 outwardly from the teeth 66.

Figure 7:
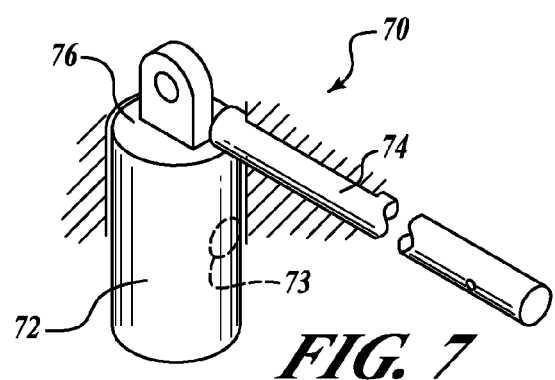
FIG. 7 is an exploded, partial cutaway isometric view of a plunger and a locking pin of a locking apparatus according to still another embodiment of the invention.

FIG. 7 is an exploded, partial cutaway isometric view of a plunger 72 and a locking pin 74 of a locking apparatus 70 according to still another embodiment of the invention. Again, many of the details of the apparatus 70 have been presented in connection with the embodiment shown in FIGS. 1 and 2 and for the sake of brevity will not be repeated. In this embodiment, a plunger 72 is configured to engage an end of the locking pin 74 on an upper surface 76 of the plunger 72. Accordingly, the plunger 72 does not require a recess that extends into the plunger 72, as disclosed in connection with a different embodiment. It may be appreciated, however, that in alternate embodiments, the plunger 72 may be configured with one or more recesses 73 adapted to receive the locking pin 74 to secure the plunger 72 in the downwardly engaged position. When it is desired to configure the apparatus 70 in the unlocked condition, the locking pin 74 may be retracted as described above in connection with other embodiments.

Figure 8:
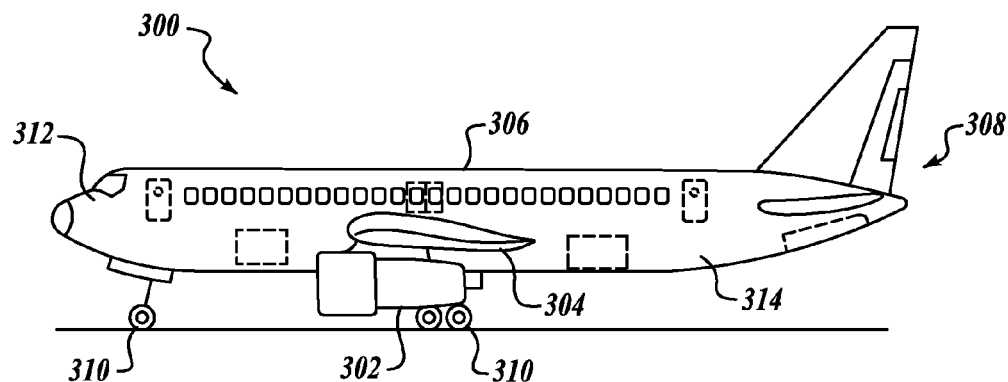
FIG. 8 is a side elevation view of an aircraft having one or more of the disclosed embodiments of the present invention.

Those skilled in the art will also readily recognize that the foregoing embodiments may be incorporated into a wide variety of different systems. Referring now in particular to FIG. 8, a side elevation view of an aircraft 300 having one or more of the disclosed embodiments of the present invention is shown. With the exception of the embodiments according to the present invention, the aircraft 300 includes components and subsystems generally known in the pertinent art, and in the interest of brevity, will not be described in detail. The aircraft 300 generally includes one or more propulsion units 302 that are coupled to wing assemblies 304, or alternately, to a fuselage 306 or even other portions of the aircraft 300. Additionally, the aircraft 300 also includes a tail assembly 308 and a landing assembly 310 coupled to the fuselage 306. The aircraft 300 further includes other systems and subsystems generally required for the proper operation of the aircraft 300. For example, the aircraft 300 includes a flight control system 312 (not shown in FIG. 8), as well as a plurality of other electrical, mechanical and electromechanical systems that cooperatively perform a variety of tasks necessary for the operation of the aircraft 300. Accordingly, the aircraft 300 is generally representative of a commercial passenger aircraft, which may include, for example, the 737, 747, 757, 767 and 777 commercial passenger aircraft available from The Boeing Company of Chicago, Ill. Although the aircraft 300 shown in FIG. 8 generally shows a commercial passenger aircraft, it is understood that the various embodiments of the present invention may also be incorporated into flight vehicles of other types. Examples of such flight vehicles may include manned or even unmanned military aircraft, rotary wing aircraft, or even ballistic flight vehicles, as illustrated more fully in various descriptive volumes, such as Jane's All The World's Aircraft, available from Jane's Information Group, Ltd. of Coulsdon, Surrey, UK.

With reference still to FIG. 8, the aircraft 300 may include one or more of the embodiments of the locking assembly 314 according to the present invention, which may be positioned in various locations within the aircraft 300. In addition, the various embodiments of the present invention may also be incorporated into other components commonly employed in the aircraft 300, such as cargo containers, cargo pallets, and other payload articles that must be fixedly coupled to a floor, or other supporting surfaces of the aircraft 300. For example, the various embodiments of the present invention may be used to anchor partition sections to a floor, or to anchor lavatory and/or galley portions to a floor structure in a commercial aircraft.

Figures 9, 10:
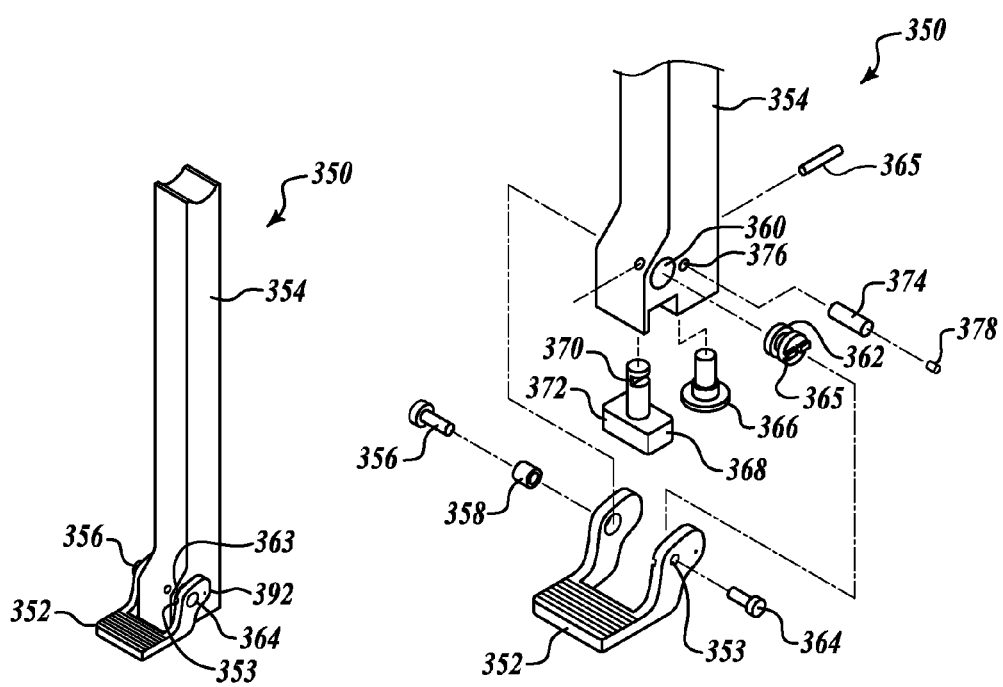
FIG. 9 is a isometric view of a locking assembly for securing a payload article according to another embodiment of the invention.
FIG. 10 is an exploded view of the locking assembly of FIG. 9.

FIG. 9 is an isometric view of a locking assembly 350 for securing a payload article according to another embodiment of the invention. FIG. 10 is an exploded view of the locking assembly 350 of FIG. 9. In this embodiment, the locking assembly 350 includes a pedal 352 rotatably coupled to a vertically-extending leg 354. The leg 354 may be part of the payload article that is being secured within the aircraft, such as, for example, a front leg of a passenger seat assembly. As best shown in FIG. 10, the pedal 352 is rotatably coupled to the leg 354 by a first screw 356 that extends through a spacer 358 (and a portion of the pedal 352) and into a first bore 360 disposed through the leg 354. The first screw 356 threadedly engages with a cam bushing 362 that is seated within the first bore 360. A second screw 364 passes through the pedal 352 and into the cam bushing 362, and a roll pin 365 extends through the leg 354 and secures the cam bushing 362 within the first bore 360. As best shown in FIG. 10, the cam bushing 362 includes a tab 363 that extends outwardly from the first bore 360 and engages with a slot 353 formed in the pedal 352. Thus, the cam bushing 362 upwardly biases the pedal 352 into an unlocked position 380 (FIG. 11).

As further shown in FIG. 10, a stud 366 is coupled to the leg 354 that is upwardly biased by a spring and extends downwardly from the bottom of the leg 354. A plunger 368 is movably coupled to the bottom of the leg 354, and includes a shaft 370 coupled to an engagement member 372. A detent spring 374 is disposed within a second bore 376 formed within the leg 354, and a detent pin 378 is coupled to the detent spring 374 and is biased outwardly from the second bore 376 by the detent spring 374.

Figure 11:
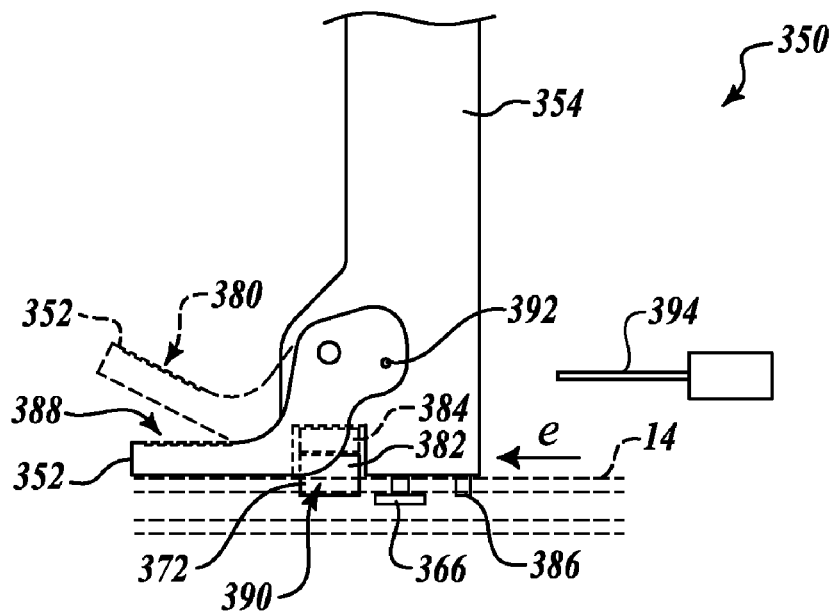
FIG. 11 is a side elevational view of the locking assembly of FIG. 9.

FIG. 11 is an enlarged side elevational view of the locking assembly 350 of FIG. 9. In operation, the pedal 352 is rotated upwardly into the unlocked position 380 by the biasing force exerted by the plunger 368 that is movably coupled to the cam bushing 362. The shaft 370 of the plunger 368 is coupled to the pedal 352 such that, with the pedal 352 in the unlocked position 380, the engagement member 372 of the plunger 368 is drawn upwardly into a disengaged position 384 within a cavity 382 formed in the bottom of the leg 354. The locking assembly 350 is then engaged with the track 14 by engaging the stud 366 through one of the clearance openings 14e. An alignment member 386 extends downwardly from the bottom of the leg 354, and also extends into one of the clearance openings 14e of the track 14.

The locking assembly 350 is then laterally translated a predetermined distance e along the track 14 until the alignment member 386 abuts a portion of one of the clearance openings 14e, as shown, for example, in FIG. 4. Translation of the locking assembly 350 along the track 14 also allows the stud 366 to interferingly engage the interior surfaces of the flange portions 14c so that the locking assembly 350 is now retained by the track 14. The pedal 352 is then rotated downwardly into a locking position 388, which drives the engagement member 372 of the plunger 368 downwardly into an engaged position 390, engaging the engagement member 372 into one of the clearance openings 14e of the track 14.

With the pedal 352 in the locking position 388 (and the engagement member 372 in the engaged position 390), the locking assembly 350 is firmly secured into engagement with the track 14, thereby preventing movement of the locking assembly 350 with respect to the track 14. Also, in the locking position 388, the detent pin 378, which is outwardly biased by the detent spring 374, slides outwardly into a locking aperture 392 disposed in the pedal 352, thereby locking the pedal 352 in the locking position 388. To release the locking assembly 350 from the track 14 for removal or repositioning, a tool 394 (FIG. 11) is inserted into the locking aperture 392 and force is applied to the detent pin 378 to compress the detent spring 374, thereby releasing the pedal 352. In turn, the pedal 352 is moved upwardly by the biasing force of the spring bushing 362 into the unlocked position 380, and the engagement member 372 is moved into the disengaged position 384, allowing the locking assembly 350 to be removed from (or repositioned along) the track 14.

Figure 12:
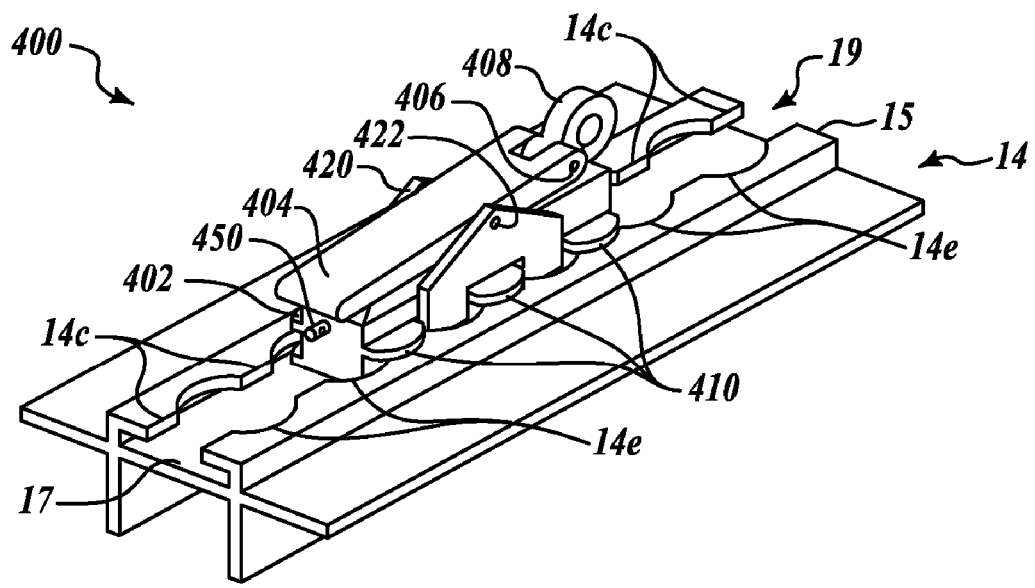
FIG. 12 is an isometric view of a locking assembly for securing a payload article in accordance with yet another embodiment of the invention.
Figure 13:
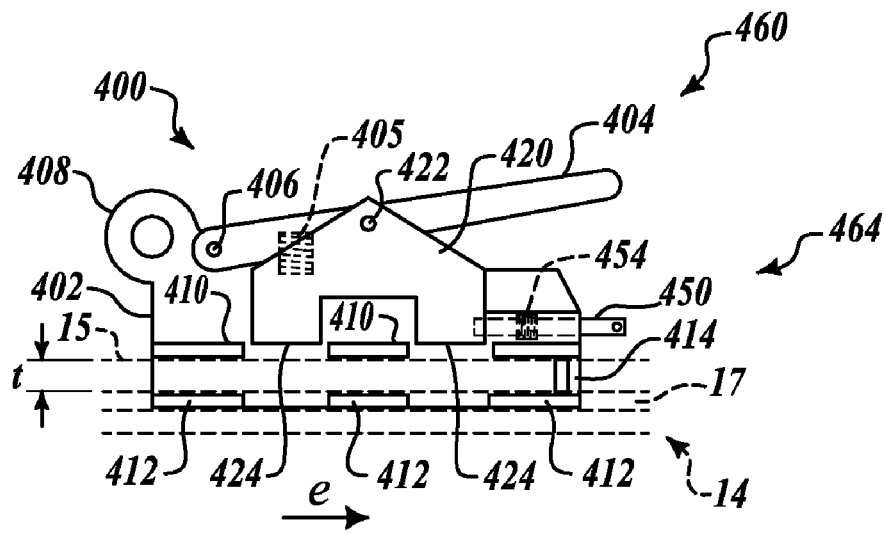
FIG. 13 is a side elevational view of the locking assembly of FIG. 12 in an unlocked position.
Figure 14:
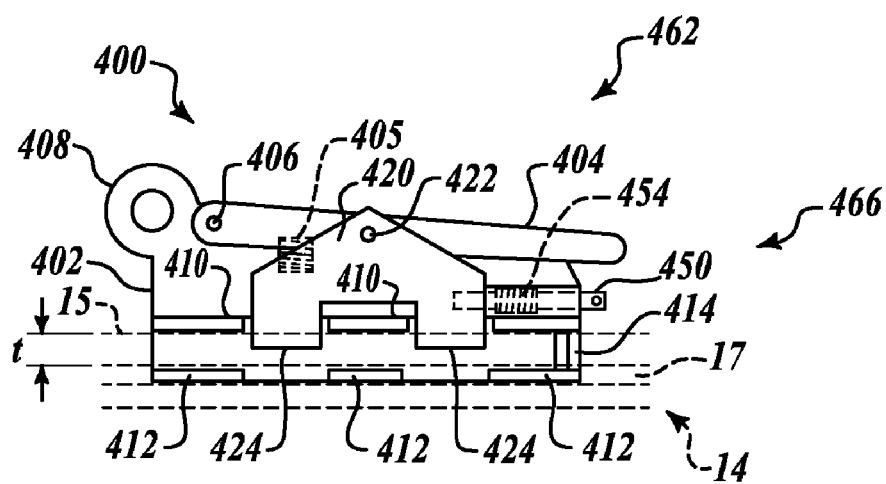
FIG. 14 is a side elevational view of the locking assembly of FIG. 12 in a locked position.
Figure 15:
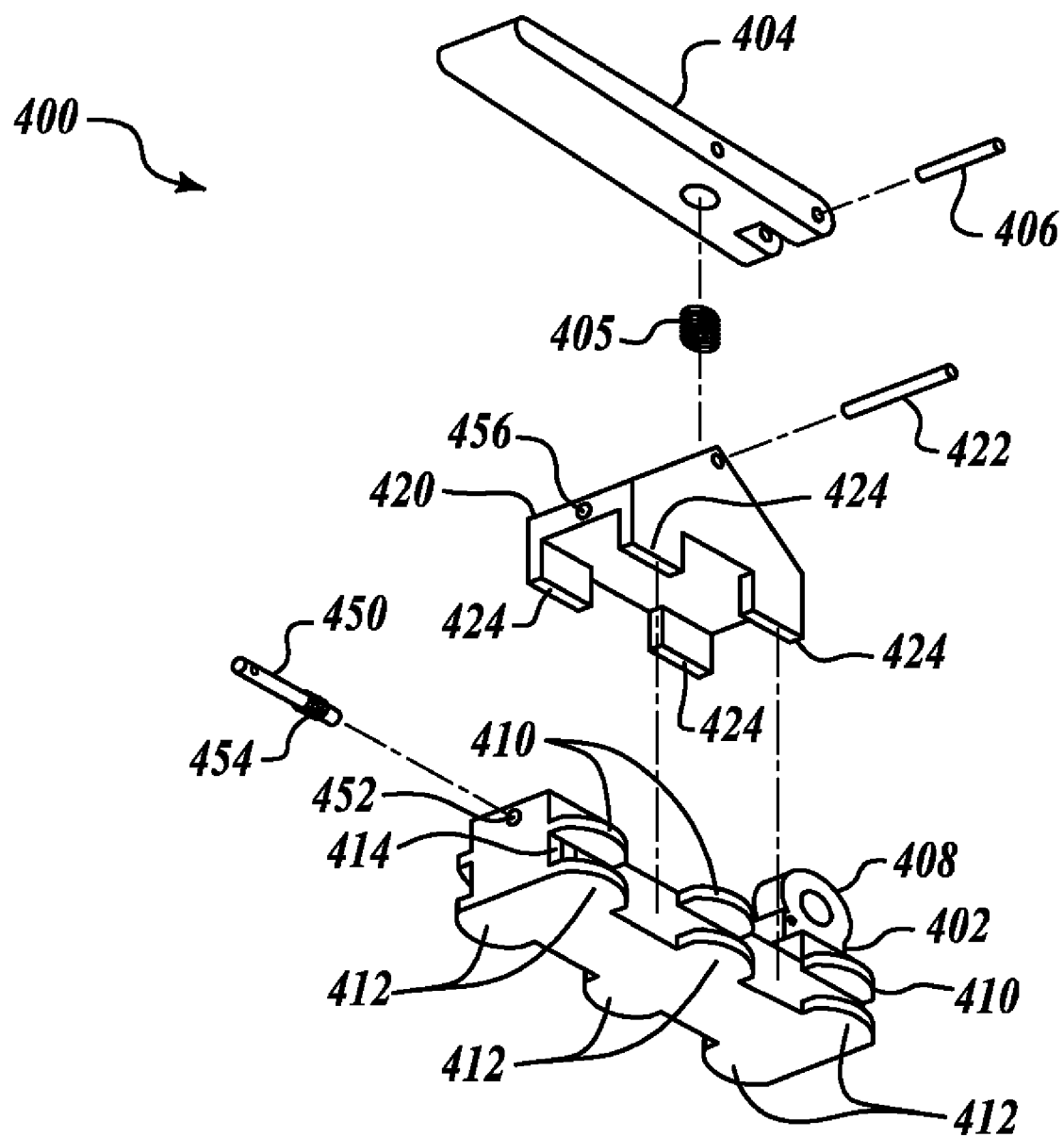
FIG. 15 is an exploded isometric view of the locking assembly of FIG. 12.

FIG. 12 is an isometric view of a locking assembly 400 engaged with the track 14 in accordance with yet another embodiment of the invention. FIGS. 13 and 14 are side elevational views of the locking assembly 400 of FIG. 12. FIG. 15 is an exploded isometric view of the locking assembly 400 of FIG. 12. In this embodiment, the locking assembly 400 includes a main body 402, and a lever 404 rotatably coupled to the main body 402 by a first shaft 406. A spring 405 is disposed between the main body 402 and the lever 404, biasing the lever 404 away from the main body 402. The main body 402 includes an attachment point (or "eye") 408 that is adapted to or coupled to a payload, such as, for example, a rear leg of a passenger seat assembly (not shown).

The main body 402 also includes a plurality of upper engagement portions 410 and a corresponding plurality of lower engagement portions 412 (FIGS. 13 and 14). The upper and lower engagement portions 410, 412 extend outwardly from the lateral sides of the main body 402 (FIG. 15), and are spaced apart in the vertical direction by a distance approximately equal to a thickness t of an upper portion 15 of the track 14 (FIGS. 13 and 14). In this embodiment, three pairs of upper and lower engagement portions 410, 412 extend outwardly from each of the lateral sides of the main body 402. The lower engagement portions 412 are configured to be received into the clearance openings 14e of the track 14, and as best shown in FIGS. 13 and 14, and to rest on a lower surface 17 of a channel 19 formed in the track 14.

Proximate an end of the main body 402, and disposed between the endmost of the upper and lower engagement portions 410, 412, a self-alignment member 414 projects outwardly from each lateral side of the main body 402. Like the previously-described self-alignment tab 22 shown in FIGS. 1, 3, and 4, the self-alignment members 414 are configured to fittingly engage with a portion of a clearance opening 14e disposed within the track 14.

As further shown in FIGS. 12-15, the locking assembly 400 further includes a saddle member 420 coupled to the lever 404 by a second shaft 422. In this embodiment, the saddle member 420 includes a pair of locking arms 424 which extended downwardly along each lateral side in the main body 402. Each pair of locking arms 424 is sized and spaced apart in order to fit between adjacent pairs of the upper engagement portions 410 which project outwardly from each lateral side of the main body 402. Each locking arm 424 is further configured to fittingly engage into a corresponding clearance opening 14e disposed within the track 14.

A locking pin 450 is disposed within a longitudinal bore 452 (FIG. 15) in the main body 402. A locking spring 454 is seated within the longitudinal bore 452 and is engaged with the locking pin 450 and the main body 402, biasing the locking pin 450 toward the saddle member 420. As shown in FIG. 15, a locking cavity 456 is disposed in the saddle member 420 and is adapted to receive the locking pin 450.

In operation, as shown in FIG. 13, the locking pin 450 is initially withdrawn into an unsecured position 464 so that the saddle member 420 (and lever 404) is free to move. With the lever 404 of the locking assembly 400 positioned in a disengaged position 460 (FIG. 13), the lower engagement portions 412 of the main body 402 are disposed through clearance openings 14e of the track 14 such that the main body 402 rests on the lower surface 17 of the channel 19. Also, in the disengaged position 460, the saddle member 420 is raised away from the main body 402 so that the locking arms 424 are disengaged from the track 14.

The locking assembly 400 is then laterally translated a distance e along the track 14 until the self-alignment members 414 engage against edge portions of one of the clearance openings 14e. Translation of the locking assembly 400 along the track 14 also positions the engagement portions 410, 412 adjacent the flange portions 14c, so that the lower engagement portions 412 interferingly engage the flange portions 14c and preventing the locking assembly 400 from being lifted from the channel 19 of the track 14.

As shown in FIG. 14, after the locking assembly 400 is translated the distance e, the lever 404 is rotated downwardly into an engaged position 462, compressing the spring 405 and engaging the locking arms 424 of the saddle member 420 into corresponding clearance openings 14e of the track 14. Also, with the saddle member 420 in the engaged position 462, the locking cavity 456 in the saddle member 420 is aligned with the longitudinal bore 452 in the main body 402. As further shown in FIG. 14, the locking spring 454 biases the locking pin 450 toward the saddle member 420 so that the locking pin 450 partially projects into the locking cavity 456 in a secured position 466, thereby securing the saddle member 420 and lever 404 in the engaged position 462. With the lever 404 and saddle member 420 in the engaged position 462, the locking assembly 400 is firmly secured into engagement with the track 14, thereby preventing movement of the locking assembly 400 with respect to the track 14.

To release the locking assembly 400 from the track 14, the locking pin 450 is withdrawn from the locking cavity 456, and the lever 404 and saddle member 420 are moved into the disengaged position 460, disengaging the locking arms 424 from the clearance openings 14e. The spring 405 biases the lever 404 upwardly into the disengaged position 460. The locking assembly 400 is then translated in an opposite direction by the distance e, causing the engagement portions 410, 412 to become realigned with the clearance openings 14e, and allowing the locking assembly 400 to be removed from (or repositioned along) the track 14.

Figure 16:
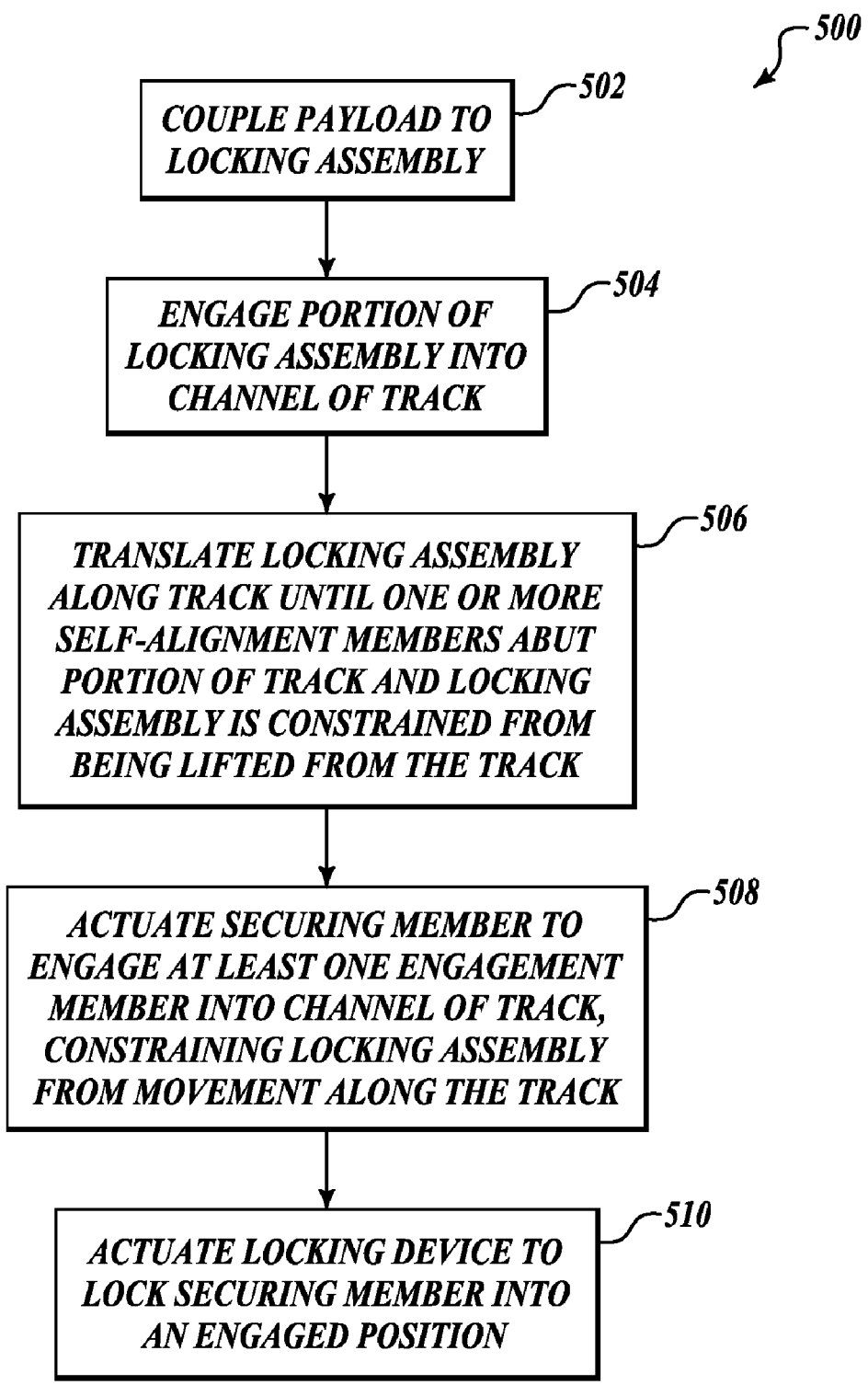
FIG. 16 is a flowchart of a method of securing a payload using a locking assembly in accordance with another embodiment of the invention.

FIG. 16 is a flowchart of a method 500 of securing a payload to a track, such as a track disposed within a floor structure of an aircraft, in accordance with an embodiment of the invention. At a block 502, the payload is coupled to a locking assembly. The payload and locking assembly may be separate components and may be coupled by any suitable coupling device or method (e.g. bolts, screws, clamps, welding, etc.), or alternately, the locking assembly may be integrally formed with the payload. At a block 504, a portion of the locking assembly is engaged into a channel of the track. As described more fully above, the portion of the locking assembly that is engaged into the channel may take a variety of forms, including, for example, one or more bolts 20 (FIGS. 1-4), studs 366 (FIGS. 9-11), portions of a body 402 (FIGS. 12-15), or any other suitably configured portion of the locking assembly.

Next, at a block 506, the locking assembly is translated along the track until one or more self-alignment portions of the locking assembly abut corresponding portions of the track. A translation distance is configured so that after the translation, the locking assembly is constrained from being lifted from the track by interference between the portions of the locking assembly engaged into the track and corresponding portions of the track. At a block 508, a securing member of the locking assembly is actuated, engaging at least one engagement member into the channel of the track, and constraining the locking assembly from movement along the track. As described above, in some embodiments, the actuation of the securing member into an engaged position includes actuating the securing member against a biasing force applied by a biasing member. For example, in one particular embodiment, the actuation of the securing member includes compressing a spring member. The payload is thereby secured to the track.

At an optional block 510, a locking device is actuated to lock the securing member into the engaged position. As described above, in some embodiments, the actuation of the locking device is performed automatically, such as by a biasing device that automatically actuates a locking pin into locking engagement with the securing member when the securing member is moved into the engaged position.

Embodiments of apparatus and methods in accordance with the present invention may advantageously reduce the time and expense associated with installation and removal of payloads from within an aircraft. Such embodiments may also improve the performance and maintainability of such payload securing apparatus in comparison with the prior art by providing a tool-less technique for quickly and efficiently securing payloads to a track. Embodiments having self-alignment features may improve the accuracy of the payload installation, and may reduce the time and effort associated with proper positioning of the payload on the track.

Figure 17:
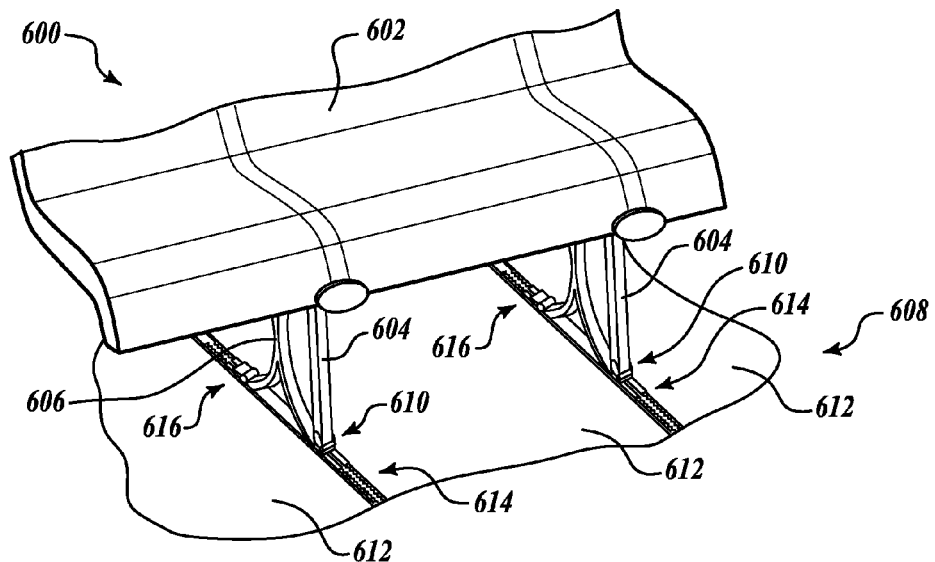
FIG. 17 is an isometric view of an aircraft seat installation including locking assemblies in accordance with yet another embodiment of the invention.

Also, embodiments of the invention provide an improved means of visual inspection for ensuring that payloads are properly secured because the actuation members of the present invention are easily recognized as being in a secured or unsecured position. Embodiments having a biasing member that biases the actuation member into the unsecured position further help to ensure that the locking assembly will not be inadvertently left in a position that is not fully secured with the track, and embodiments equipped with a locking mechanism that locks the actuation member into the secured position further ensure that the actuation member will not be inadvertently moved to the unsecured position. Overall, embodiments of the present invention may reduce the time and expense associated with installation and removal of payloads, and may improve the performance, inspectability, and maintainability of such locking assemblies, in comparison with the prior art As noted above, embodiments of locking assemblies in accordance with the present invention may be used to secure a variety of payload articles to a suitable support structure within an aircraft. For example, FIG. 17 is an isometric view of an aircraft seat installation 600 including front and rear locking assemblies 610, 616 in accordance with yet another embodiment of the invention. In this embodiment, the installation 600 includes a passenger seat 602 having front legs 604 and rear legs 606. A floor assembly 608 includes a pair of longitudinally extending tracks 614, and a plurality of floor panels 612. The front locking assemblies 610 secure the front legs 604 to the tracks 614, while the rear locking assemblies 616 secure the rear legs 606 to the tracks 614. The front and rear locking assemblies 610, 616 may be embodiments of locking assemblies as described above with respect to FIGS. 1-16. Alternately, one or more of these locking assemblies may comprise alternate embodiments of locking assemblies as described below.

Figure 18:
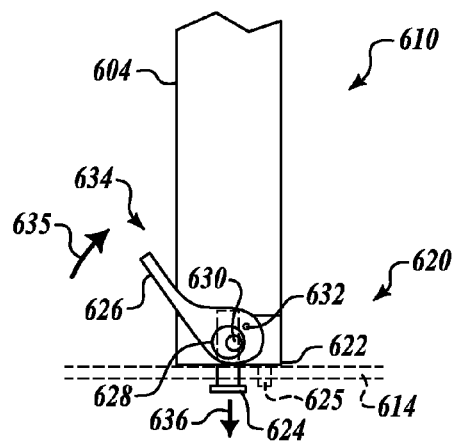
FIGS. 18 and 19 are side elevational views of the locking assembly of FIG. 17 in unsecured and secured positions, respectively.
Figure 19:
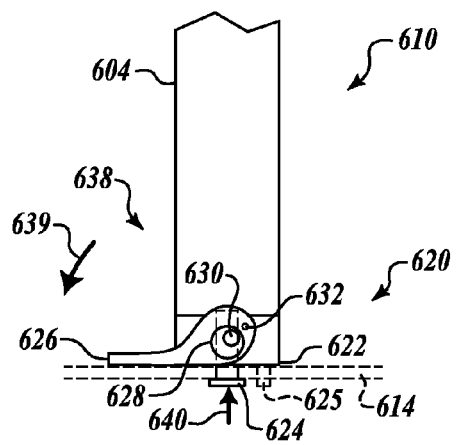

FIGS. 18 and 19 are side elevational views of the front locking assembly 610 of FIG. 17 in unsecured and secured positions, respectively. In this embodiment, the front locking assembly 610 includes an actuation mechanism 620 that is removably coupled to a bottom portion of the front leg 604. in alternate embodiments, the actuation mechanism 620 may be non-removably coupled to the front leg 604, or may be integrally formed with the front leg 604. The actuation mechanism 620 includes a housing 622, and a stud 624 is moveably disposed through the housing 622. An actuator pedal 626 is rotatably coupled to an outer portion of the housing 622 by lateral attachment devices 628 (one visible). One or both of the lateral attachment devices 628 may include a biasing member (e.g. a coil spring) that biases the actuator pedal 626 upwardly into the unsecured position 634. A connector shaft 630 extends through the housing 622 and couples the actuator pedal 626 to the movable stud 624, and a locking aperture 632 is disposed in the actuator pedal 626.

In operation, the actuator pedal 626 is rotated upwardly (arrow 635) to place the front locking assembly 610 into the unsecured position 634 shown in FIG. 18. In this embodiment, in the unsecured position 634, the actuator pedal 626 abuts the front leg 604. As the actuator pedal 626 is rotated upwardly, the stud 624 is moved in an outward direction 636 by the connector shaft 630. The stud 624 may then be inserted through a clearance opening 14e of the track 614 (FIG. 17), and may be laterally translated by an appropriate distance e to align the stud 624 with engagement flanges 14c of the track 614.

As shown in FIGS. 18 and 19, the locking assembly 610 may include a self-alignment feature, such as the self-alignment member 625 projecting downwardly from the housing 622, to ensure proper positioning of the stud 624 with the engagement flanges 14c, as described more fully above. Alternately, for payload installations having both front and rear locking assemblies, such as the passenger seat installation 600 shown in FIG. 17, it may be sufficient (or preferable) for only one or the other of the front and rear locking assemblies to include self-alignment features. For example, in one particular embodiment, the rear locking assemblies 616 include self-alignment features (e.g. self-alignment member 625), while the front locking assemblies 610 do not.

With the stud 624 in a desired position on the track 614, the actuator pedal 626 is rotated downwardly (arrow 639) to place the front locking assembly 610 into the secured position 638 shown in FIG. 19. As the actuator pedal 626 is rotated downwardly, the stud 624 is moved in an inward direction 640 by the connector shaft 630, clampably engaging the engagement flanges 14c of the track 614 between the head portion of the stud 624 and the housing 622. In this embodiment, in the secured position 638, the actuator pedal 626 is engaged against an upper surface of the track 614, providing a fast and efficient means of visually confirming that the front locking assembly 610 is in the secured position 638. Also, in the secured position 638, the locking aperture 632 of the actuator pedal 626 is aligned with a spring-loaded locking pin disposed in the housing 622 (e.g. detent pin 378 and detent spring 374 described above and shown in FIGS. 9-11).

FIGS. 20 and 21 are side and front elevational views of a locking assembly 650 for securing a payload article (e.g. a passenger seat) in accordance with yet another embodiment of the invention. In this embodiment, the locking assembly 650 includes an actuation mechanism 660 having a housing 662 that is coupled to (or integrally formed with) the front leg 604. A bottom member 663 is movably secured to the housing 662 (or front leg 604), and a stud 664 extends downwardly from the actuation mechanism 660. An actuator pedal 666 is rotatably coupled to the actuation mechanism 660 by lateral attachment devices 668. One or both of the lateral attachment devices 668 may include a biasing member that biases the actuator pedal 666 upwardly into an unsecured position 674 (FIG. 22). The locking assembly 650 may include a self-alignment feature, such as the self-alignment member 665 projecting downwardly from the bottom member 663, to ensure proper positioning of the locking assembly 650 on the track 614.

In operation, after the stud 664 is positioned in a desired location on the track 614, the actuator pedal 666 is rotated downwardly (arrow 679) to place the front locking assembly 650 into the secured position 678 shown in FIG. 20. In this embodiment, the stud 664 remains in a fixed position as the actuator pedal 666 is actuated, however, a cam portion 667 of the actuator pedal 666 forces the bottom member 663 in an outward direction 676 (FIG. 20) away from the front leg 604. The track 614 is clamped between the bottom member 663 and the stud 664. In the secured position 678, a locking aperture 672 of the actuator pedal 666 may be aligned with a spring-loaded locking pin (e.g. detent pin 378 and detent spring 374 described above and shown in FIGS. 9-11) to securely locked the actuator pedal 666 in the secured position 678.

To release the locking assembly 650 from the track 614, a tool may be inserted into the locking aperture 672 to depress the spring-loaded locking pin, unlocking the actuator pedal 666 from the secured position 678. The actuator pedal 666 may be rotated upwardly (arrow 675), causing the cam portion 667 to remove its downward force from the bottom member 663, and moving the bottom member 663 in an inward direction (arrow 680). With the locking assembly 650 in the unsecured position 674 (FIG. 22), the clamping pressure applied by the bottom member 663 against the track 614 is released. In one embodiment, the bottom member 663 may be coupled to the actuator pedal 666, while in alternate embodiments, the bottom member 663 may be coupled to the housing 662 (e.g. by slide rods). After the actuator pedal 666 is rotated into the unsecured position 674, the locking assembly 650 is translated along the track 614 until the stud 664 no longer engages with the engagement flanges 14c of the track 614, and the locking assembly 650 may be lifted away from the track 614.

Although the locking assemblies 610, 650 had been described above and shown in FIGS. 17-22 as being used on the front leg 604 of the passenger seat assembly 602, in alternate embodiments, locking assemblies in accordance with the invention may be adapted to operate with rear legs of a passenger seat assembly, or any other suitable portions of a payload article. In the following discussion, various alternate embodiments of locking assemblies in accordance with the invention are described. For the sake of brevity, only substantial differences in the structure and operation of such alternate embodiments will be described in detail.

Figure 23:
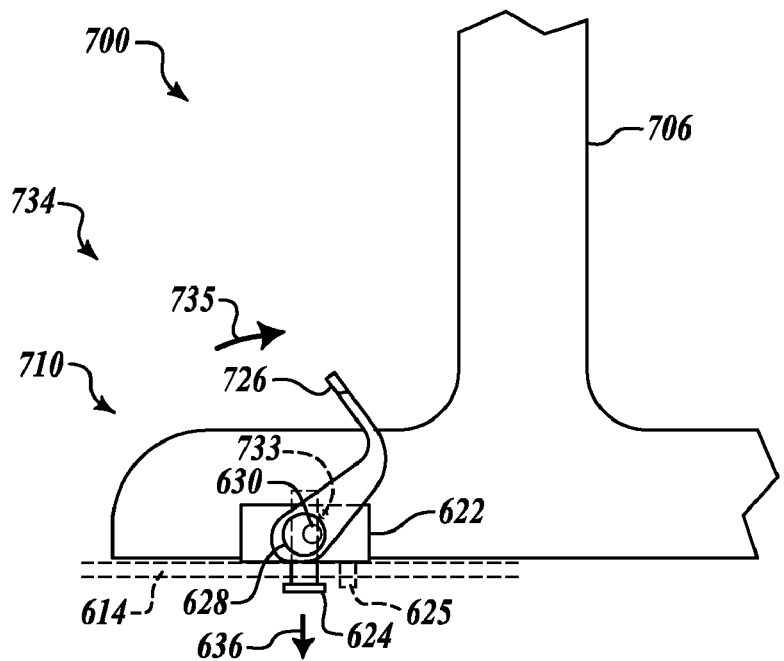
FIGS. 23 and 24 are side elevational views of a locking assembly for securing a payload article in unsecured and secured positions, respectively, accordance with a further embodiment of the invention.
Figure 24:
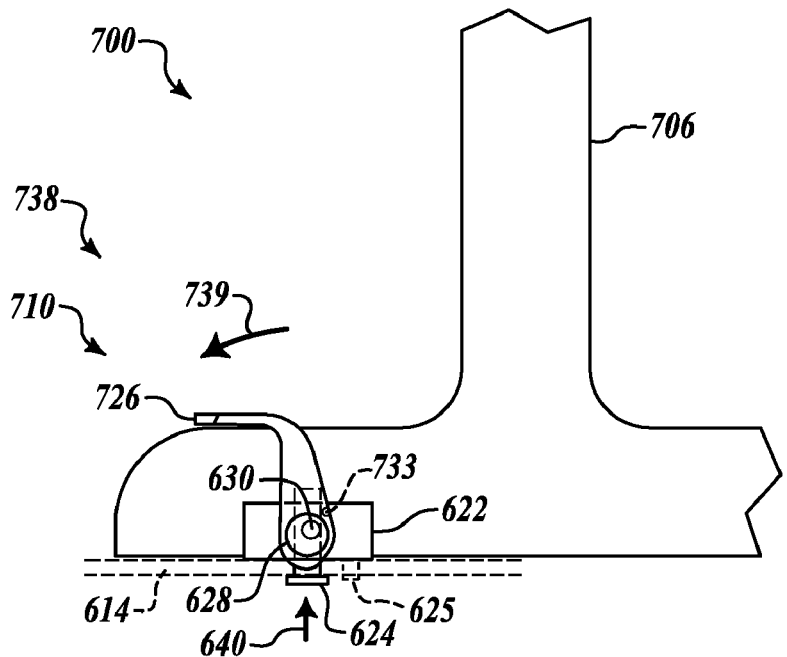

FIGS. 23 and 24 are side elevational views of a locking assembly 700 in unsecured and secured positions, respectively, in accordance with a further embodiment of the invention. In this embodiment, the locking assembly 700 includes an actuation mechanism 710 coupled to a support member 706 (e.g. a rear leg) of a payload article. The actuation mechanism 710 shown in FIGS. 23 and 24 is similar to the actuation mechanism 620 described above with reference to FIG. 18 in 19, wherein the same reference numerals are used to refer to the same (or similar) components.

With reference to FIG. 23, in operation, an actuator pedal 726 is rotated upwardly (arrow 735) to place the locking assembly 700 in the unsecured position 734. As the actuator pedal 726 is rotated upwardly, the stud 624 is moved in an outward direction 636 by the connector shaft 630. The stud 624 is then inserted through a clearance opening 14e (FIG. 12) of the track 614, and is laterally translated by an appropriate distance e to align the stud 624 with engagement flanges 14c of the track 614. As shown in FIGS. 23 and 24, the locking assembly 700 may include a self-alignment feature, such as the self-alignment member 625 projecting downwardly from the housing 622, to ensure proper positioning of the stud 624 with the engagement flanges 14c, as described more fully above.

With the stud 624 in a desired position on the track 614, the actuator pedal 726 is rotated downwardly (arrow 739) to place the front locking assembly 610 into the secured position 738 (FIG. 24). As the actuator pedal 726 is rotated downwardly, the stud 624 is moved in an inward direction 640 by the connector shaft 630, clampably engaging the engagement flanges 14c of the track 614 between the head portion of the stud 624 and the housing 622.

As further shown in FIG. 24, in the secured position 738, the actuator pedal 726 is engaged against an upper surface of the support member 706, again providing an efficient means of visually confirming that the locking assembly 700 is in the secured position 738. Also, in the secured position 738, a locking aperture (not visible) disposed in the actuator pedal 726 is aligned with a spring-loaded locking pin 733 disposed in the housing 622, thereby locking the actuator pedal 726 in the secured position 738.

Figure 25:
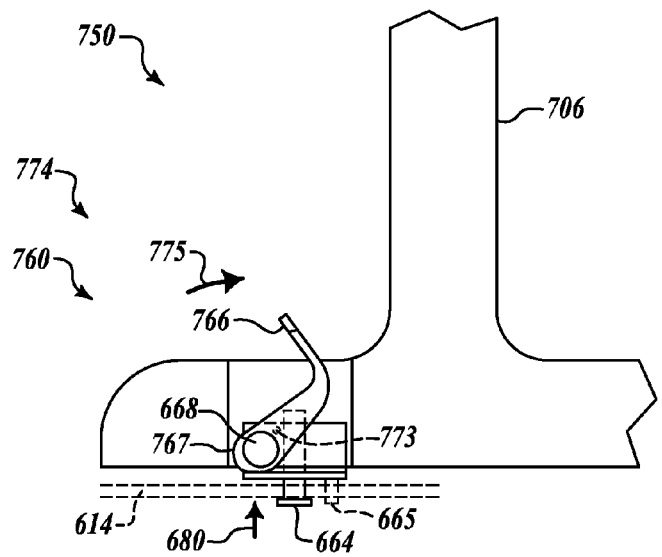
FIGS. 25 and 26 are side and front elevational views, respectively, of a locking assembly for securing a payload article in accordance with another alternate embodiment of the invention.
Figure 26:
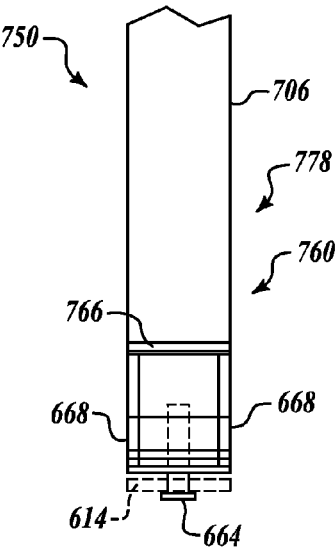
Figure 27:
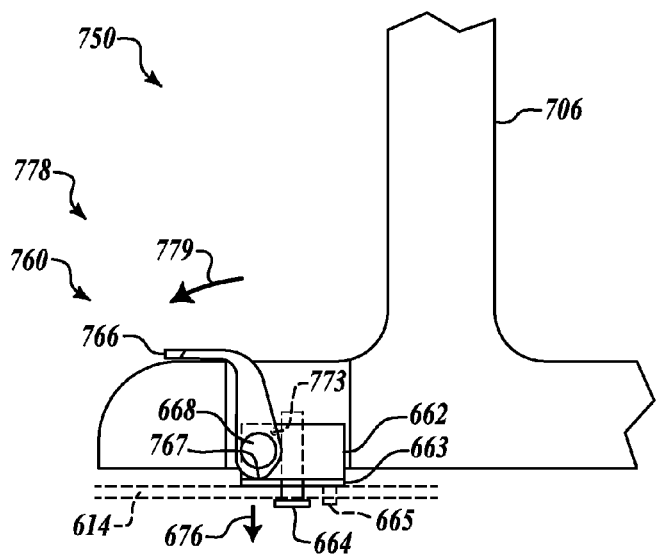
FIG. 27 is a side elevational view of the locking assembly of FIG. 25 in a secured position.

FIGS. 25 and 26 are side and front elevational views, respectively, of a locking assembly 750 in accordance with another alternate embodiment of the invention. FIG. 27 is a side elevational view of the locking assembly 750 of FIG. 25 in a secured position 778. In this embodiment, the locking assembly 750 includes an actuation mechanism 760 coupled to a support member 706. The actuation mechanism 760 shown in FIGS. 25 and 26 is similar to the actuation mechanism 660 described above with reference to FIGS. 20-22, wherein the same reference numerals are used to refer to the same (or similar) components.

As shown in FIG. 27, after the stud 664 is positioned in a desired location on the track 614, an actuator pedal 766 is rotated downwardly (arrow 779) to place the locking assembly 750 into the secured position 778. As described above with reference to the locking assembly 650, the stud 664 remains in a fixed position as the actuator pedal 766 is actuated, and a cam portion 767 of the actuator pedal 766 forces a bottom member 663 in an outward direction 676 away from the support member 706. In the secured position 778, the track 614 is clamped between the bottom member 663 and the stud 664, and a locking aperture (not visible) of the actuator pedal 766 is aligned with a spring-loaded locking pin 773 to securely lock the actuator pedal 766 in the secured position 778.

Similar to several previously-described embodiments, to release the locking assembly 750 from the track 614, a tool may be inserted into the locking aperture to depress the spring-loaded locking pin 773, unlocking the actuator pedal 766 from the secured position 778. As shown in FIG. 25, the actuator pedal 766 may be rotated upwardly (arrow 775), causing the cam portion 767 to remove its downward force from the bottom member 663, and moving the bottom member 663 in an inward direction (arrow 680). With the locking assembly 750 in the unsecured position 774 (FIG. 25), the clamping pressure applied by the bottom member 663 against the track 614 is released, allowing the locking assembly 750 (and the payload article) to be removed or repositioned along the track 614.

Figure 28:
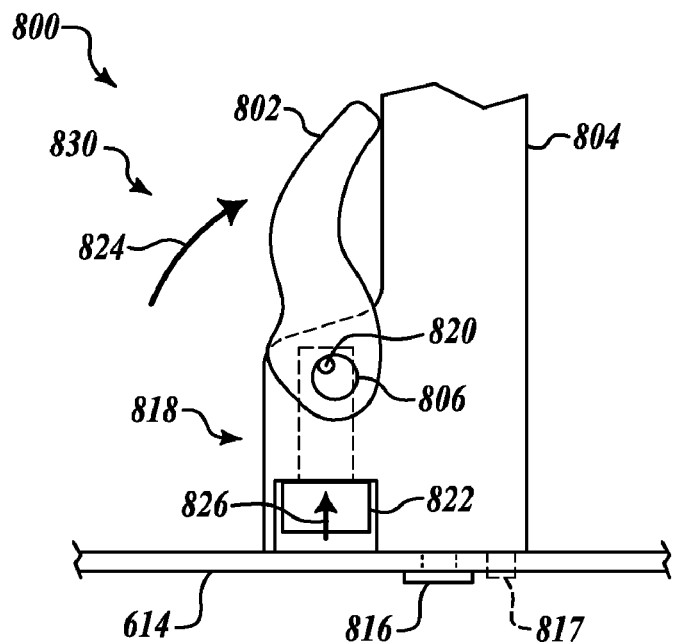
FIGS. 28 and 29 are side elevational views of a locking assembly for securing a payload article in unsecured and secured positions, respectively, accordance with still another alternate embodiment of the invention.
Figure 29:
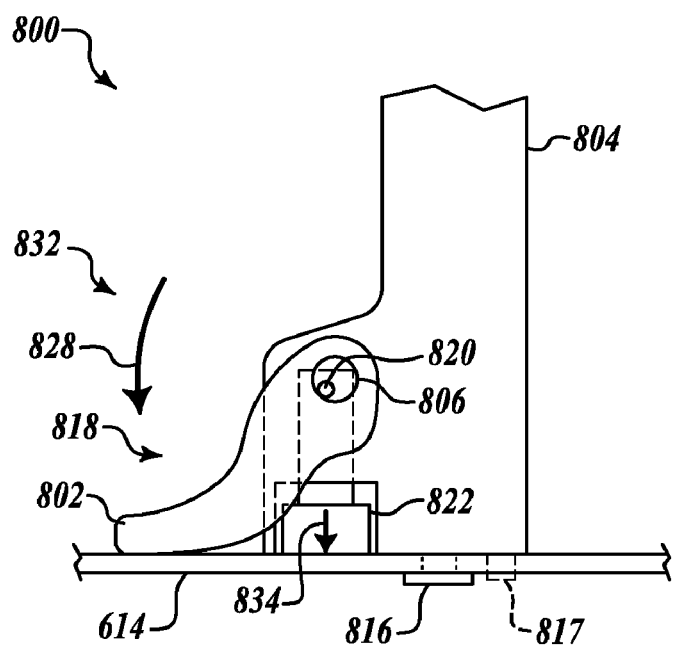

FIGS. 28 and 29 are side elevational views of a locking assembly 800 for securing a payload article in accordance with still another alternate embodiment of the invention. In this embodiment, the locking assembly 800 includes a pedal 802 rotatably coupled to a vertically-extending support 804. The support 804 may be a portion of the payload article (e.g. a leg of a seat assembly), or alternately may be a separate component that is attached to the payload article during installation. The pedal 802 is rotatably coupled to opposing lateral sides of the support 804 by a pair of coupling devices 806. One or both of the coupling devices 806 may apply a biasing force against the pedal 802, biasing the pedal 802 upwardly into an unsecured position 830 (FIG. 28). As further shown in FIGS. 28 and 29, a stud 816 extends downwardly from the support 804. A plunger 818 is coupled to the pedal 802 by a connector shaft 820, and is vertically moveable with respect to the support 804. The plunger 818 includes an engagement portion 822.

In operation, the pedal 804 is rotated upwardly (arrow 824) (e.g. by the biasing force exerted by the coupling device 806), placing the locking assembly 800 into an unsecured position 830. As shown in FIG. 28, in the unsecured position 830, the plunger 818 is drawn in an inward direction 826 away from the track 614. The locking assembly 800 may then be positioned at a desired location on the track 614 by engaging the stud 816 through one of the clearance openings 14e. The locking assembly 800 may include a self-alignment member 817 projecting downwardly from the support 804 to ensure proper positioning of the locking assembly 800 on the track 614, as described more fully above.

As shown in FIG. 29, the pedal 802 may then be rotated downwardly (arrow 828) into a secured position 832, driving the plunger 818 in an outward direction 834 and driving the engagement portion 822 into engagement with the track 614. In the secured position 832, the track 614 is clamped between the engagement portion 822 of the plunger 818 and the stud 816, securely engaging the clamping assembly 800 with the track 614.

Figure 30:
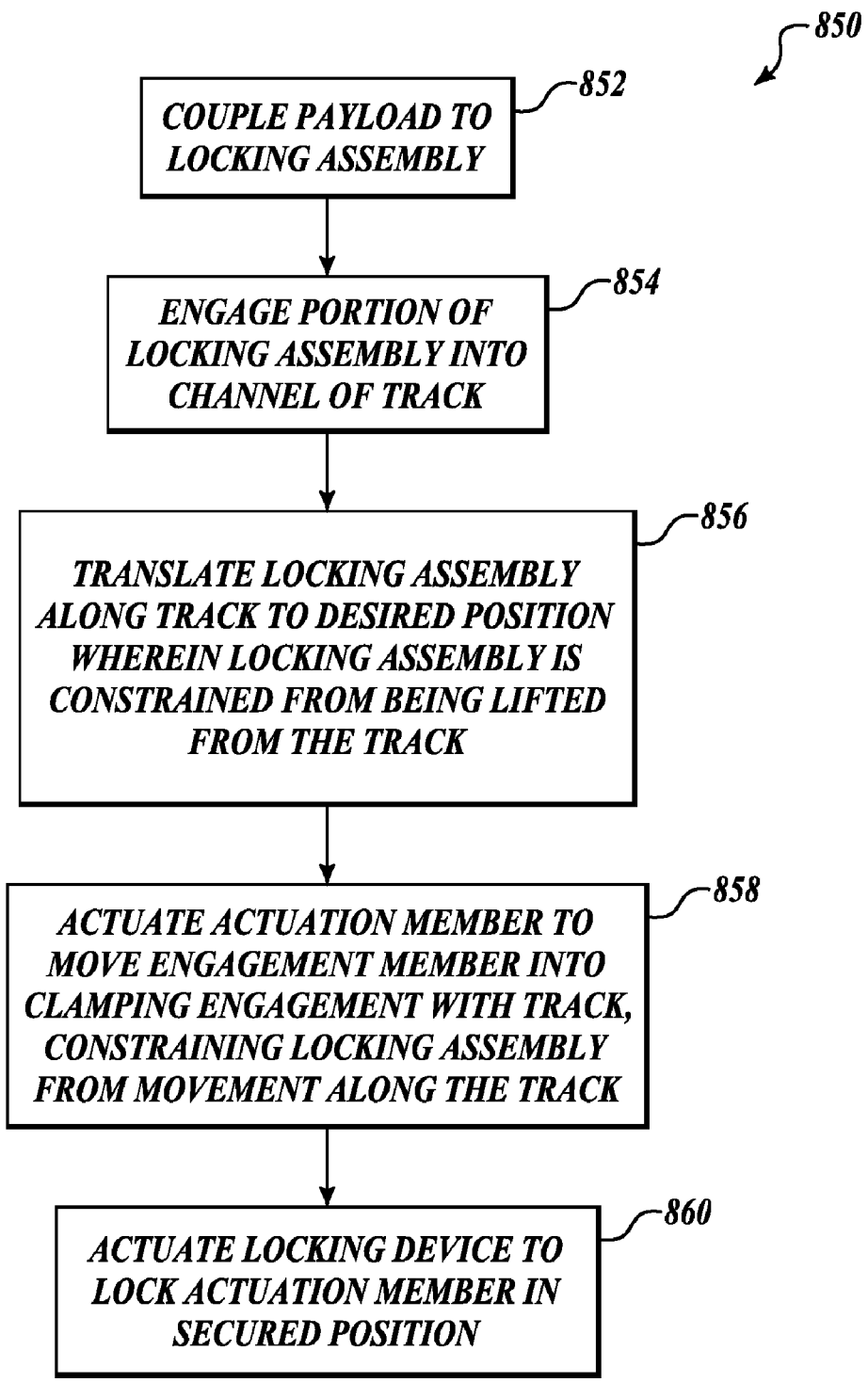
FIG. 30 is a flowchart of a method of securing a payload using a locking assembly in accordance with another alternate embodiment of the invention.

FIG. 30 is a flowchart of a method 850 of securing a payload to a track using a locking assembly in accordance with another alternate embodiment of the invention. At a block 852, the payload is coupled to a locking assembly, such as by a coupling device (e.g. bolts, screws, clamps, welding, etc.), or alternately, the locking assembly may be integrally formed with the payload. At a block 854, a portion of the locking assembly (e.g. a stud, bolt, etc.) is engaged into a channel of the track. Next, at a block 856, the locking assembly is translated along the track to a desired position such that the locking assembly is constrained from being lifted from the track by interference between the portion of the locking assembly engaged into the track and adjacent portions of the track.

At a block 858, an actuation member of the locking assembly is actuated, causing an engagement member to move into clamping engagement with a portion of the track, and thereby constraining the locking assembly from translational movement along the track. As described above, in some embodiments, the engagement member that clampingly engages against a portion of the track includes a portion of a moveable stud (FIGS. 18-19 and 23-24), a moveable bottom member (FIGS. 20-22 and 25-27), and an engagement portion of a plunger (FIGS. 28-29). The payload is thereby secured to the track.

At an optional block 860, a locking device is actuated to lock the securing member into the engaged position. As described above, in some embodiments, the actuation of the locking device is performed automatically, such as by a biasing device that automatically actuates a locking pin into locking engagement with the securing member when the securing member is moved into the engaged position.

Embodiments of apparatus and methods in accordance with the present invention may advantageously reduce the time and expense associated with installation and removal of payloads from within an aircraft. Such embodiments may also improve the performance and maintainability of such payload securing apparatus in comparison with the prior art. Embodiments of the invention enable a tool-less technique for quickly and efficiently securing payloads to a track. Embodiments of the invention having a self-alignment feature may further improve the accuracy of the payload installation.

Furthermore, because the actuation members of the present invention are easily recognized as being in a secured or unsecured position, embodiments of the invention provide an improved means of visual inspection for ensuring that payloads are properly secured. Providing locking assemblies with a biasing member that biases the actuation member into the unsecured position further helps to ensure that the locking assembly will not be inadvertently left in a position that is not fully secured with the track, since the biasing member will force the actuation member into the unsecured position to the attention of the installer or subsequent inspector. Embodiments of the invention equipped with a locking mechanism that locks the actuation member into the secured position further ensure that the actuation members will not be inadvertently moved to the unsecured position.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A locking assembly for securing a payload to a channel-shaped track, a surface of the track having a plurality of clearance openings that are spaced apart, the locking assembly comprising a body moveable along the track and an engagement member coupled to the body, the engagement member having an unsecured position for allowing the body to move along the track and a secured position for engaging the track to constrain the body from moving along the track, the body including:
   a payload attachment portion;
   an insertion portion configured to be inserted into at least one of the clearance openings and moved beneath the track surface to engage the track to prevent the body from being pulled away from the track; and
   a self-alignment feature for limiting the movement of the body along the track, the self-alignment feature configured to be inserted into another one of the clearance openings and translated along the track until abutting against an edge of said another clearance opening, at which point the insertion portion engages the track surface and the engagement member is in position to engage the track.

2. The locking assembly of claim 1, wherein the insertion portion includes at least one of a bolt, a stud, and a lateral projection.

3. A method of using the locking assembly of claim 1, comprising:
   coupling a payload to the payload attachment portion;
   inserting the insertion portion into a first clearance opening and the self-alignment feature into a second clearance opening of the track;
   translating the body along the track until the self-alignment feature abuts an edge of the second clearance opening, whereby the body is constrained from movement away from the track; and
   actuating the engagement member from an unsecured position to a secured position, whereby the body is also constrained from movement along the track.

4. The method of claim 3, wherein actuating the engagement member includes depressing a plunger.

5. The locking assembly of claim 1, wherein the engagement member includes at least one of a plunger and a saddle member, the saddle member having a plurality of outwardly projecting engagement arms.

6. The locking assembly of claim 1, wherein the engagement member is biased into the unsecured position by a biasing member.

7. The locking assembly of claim 1; further comprising a locking device configured to automatically engage to lock the engagement member into the secured position when the engagement member is moved to the secured position.

8. The locking assembly of claim 1, wherein the engagement member includes a plunger that can be ratcheted downward into one of the clearance openings.

9. The locking assembly of claim 1, further comprising a foot pedal for moving the engagement member downward.

10. The locking assembly of claim 1, wherein the self-alignment feature includes a tab that is approximately elliptical in cross section.

11. A locking assembly for securing a payload to a track, the locking assembly comprising a body moveable along the track and an engagement member coupled to the body, the body including:
   a payload attachment portion;
   an insertion portion configured to be inserted into a first clearance opening in the track and moved beneath the track to prevent the body from being pulled away from the track; and
   a self-alignment feature configured to be inserted into a second clearance opening in the track and translated along the track until abutting against an edge of the second clearance opening, at which point the engagement member is aligned with a third clearance opening in the track to engage the third clearance opening to prevent the body from moving along the track.

* * * * *